Sept. 20, 1971        C. A. EATON        3,606,079
EXPANSION CHAMBERS FOR GAS DISCHARGE OUTLETS
Filed Feb. 14, 1969
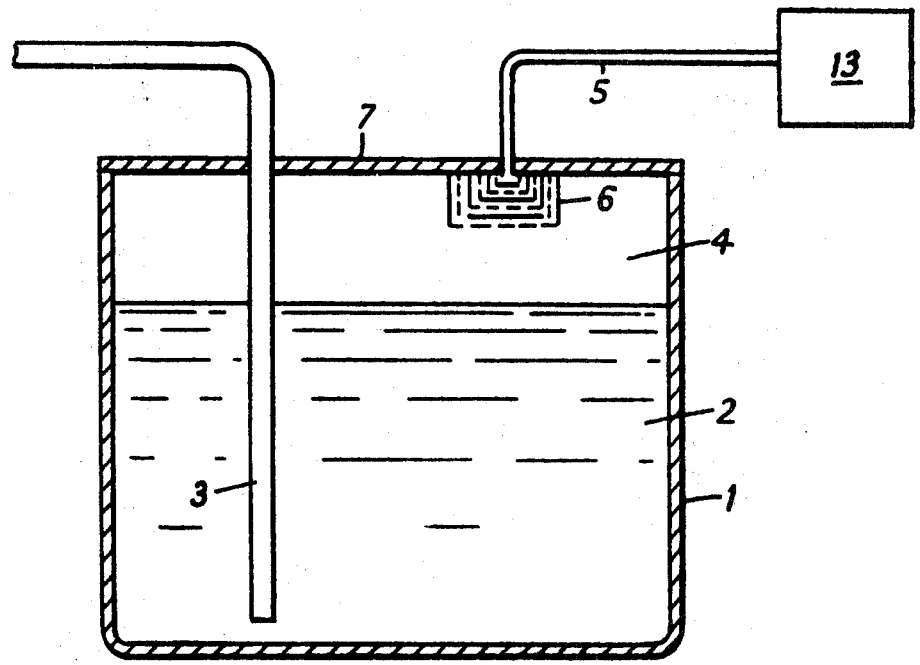
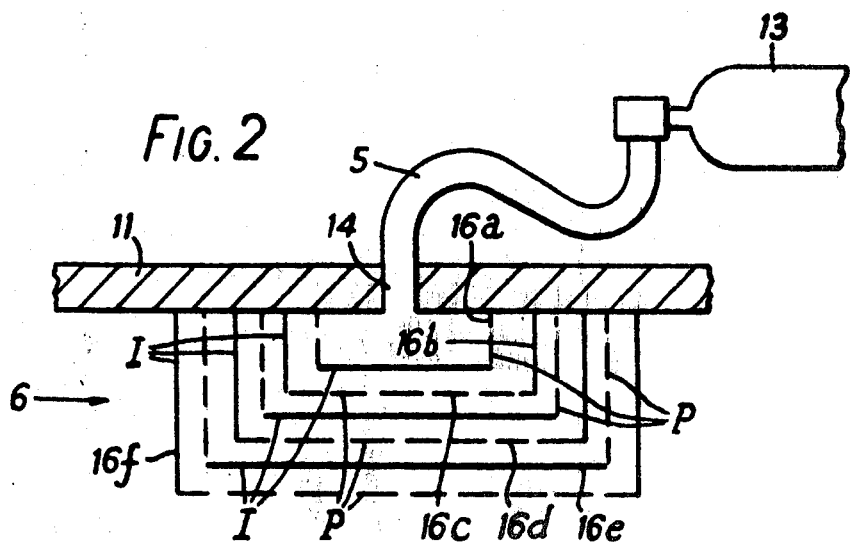

3,606,079
EXPANSION CHAMBERS FOR GAS DISCHARGE OUTLETS

Colin Ashton Eaton, West Drayton, Middlesex, England, assignor to Walter Kidde and Company, Incorporated, Belleville, N.J.
Filed Feb. 14, 1969, Ser. No. 799,378
Int. Cl. B65j 1/02
U.S. Cl. 220—86          6 Claims

ABSTRACT OF THE DISCLOSURE

A container for combustible liquids or gases having a gas inlet whereby gas from a gas discharge outlet may be admitted under pressure for expelling the contents of the container, there being provided an expansion chamber at the inlet for ensuring that there is not a large build-up of static electricity in the incoming gas. The expansion chamber comprises flow reducing means for reducing the velocity of the gas as it enters the container and an earthed conductor with which the incoming gas makes intimate contact. The earthed conductor is preferably a wire mesh.

---

The invention relates to containers for combustible liquids or gases and seeks to provide such a container with gas inlet means for allowing ingress of gas without undue accumulation of static electricity therein, thereby minimising the risk of explosion.

If the container is for storing gases then the gas inlet in question may be the inlet for the gas to be stored. However, the invention is particularly advantageous in providing an inlet for the admission of a fire preventing or extinguishing gas, such as carbon dioxide. Such gases may be used, for example, in the event of a fire risk, to pressurise the container and eject the combustible liquid or gas therefrom, replacing it with an inert atmosphere. The emergency discharging of the tanks of sea-going tankers may be effected in this way. It is found that there is a tendency for static electricity in the incoming gas to build up and give the risk of spark discharges, this being particularly true if the input velocity is high and if the gas is derived from a source in the liquid or solid state. The invention seeks to alleviate this problem.

According to one aspect of the invention there is provided a container for combustible liquids or gases having a gas inlet and an expansion chamber disposed in relation to the inlet so that gas passing into the container through the inlet passes through the expansion chamber, the expansion chamber comprising flow reducing means for reducing the velocity of the gas as it enters the container and an earthed conductor with which the incoming gas makes intimate contact. Preferably the earthed conductor is a wire mesh.

Preferably the gas inlet is an aperture in a wall of the container and the expansion chamber is fitted on the inside of the container, being fixed to the wall to surround the aperture and presenting a bore of larger cross-section than the aperture, thereby effecting a certain reduction of gas velocity, and the earthed conductor comprises a metal grid disposed so that all gas coming in through the aperture passes therethrough.

The expansion chamber may comprise an open-topped box of which at least part is constituted by said metal grid, the box being fitted with its rim attached to said wall surrounding the aperture. There may be one or more further pervious boxes of similar shape but different sizes nested one within the other and spaced apart, the rim of each box being attached to the said wall surrounding the aperture.

The invention will further be described with reference to the accompanying drawings, of which:

FIG. 1 is a diagram illustrating a container in accordance with the invention; and FIG. 2 is a sectional side elevation of the gas inlet of the container of FIG. 1 shown in greater detail.

Referring to FIG. 1 there is shown a tank 1 of a sea-going oil tanker. The tank contains liquid oil 2. In the event of an emergency provision is made to discharge the oil 2 through a discharge pipe 3 which terminates near the bottom of the tank. In order to effect discharge the space 4 above the oil is filled with carbon dioxide under pressure by way of a pipe 5 and an expansion chamber 6 mounted in the roof 7 of the tank. The source of carbon dioxide is illustrated schematically at 13.

Referring now to FIG. 2 the expansion chamber 6 is shown in greater detail. Pipe 5 terminates in a gas discharge orifice 14 in the roof 7 of the tank which is shown in FIG. 2 as being constituted by a metal wall 11. Carbon dioxide bottles 13 are provided to issue carbon dioxide at a high mass flow rate. The incoming carbon dioxide passes through the expansion chamber 6 which comprises a series of six earthed metal boxes 16a to 16f. The boxes are all of the same shape but different sizes, being cylindrical open-topped boxes nested one within another and attached by their rims to the wall 11 with which they make electrical contact. Wall 11 can be regarded as earth.

The boxes are of two kinds: in the first kind the box has a pervious wall constituted by wire mesh and an impervious steel base; in the second kind the box has a pervious wire-mesh base and an impervious steel wall. The two kinds of boxes are arranged alternately to give a baffle effect as far as the incoming carbon dioxide is concerned. In the drawing the pervious parts are marked P and the impervious parts I.

The mesh P of the three outermost boxes (16d to 16f) is fine mesh of the order of a sixteenth of an inch aperture mesh. This serves as a flame trap as well as a retarding impedance to the incoming gas. The mesh P of the three innermost boxes (16a to 16c) is relatively coarse mesh of the order of three quarters of an inch aperture mesh. This serves to prevent or minimise the formation of "snow" during the discharge of the carbon dioxide.

We have found that any static electricity formed by the discharge of gases through the orifice 14 is substantially reduced or eliminated by the earthed expansion chamber 6. We have also found that the velocity of discharge of the carbon dioxide from the outermost member 16f is sufficiently retarded that build up of static electricity in the gases after leaving the orifice 14 is relatively unimportant.

I claim:

1. A container for combustible liquid or gases including means providing a gas inlet in one wall of the container, and expansion chamber means positioned at said inlet so that gas entering through the inlet flows through the chamber means, said expansion chamber means including a plurality of chamber portions through which the inlet gas sequentially flows, each chamber portion being separated from each adjacent chamber portion by wall members one of which includes a metal grid providing gas flow between the adjacent chambers, said metal grids being positioned in nonaligned relationship to produce a baffle effect upon gas flowing through said chamber means, each of said metal grids comprising an earthed conductor for dissipating static electricity.

2. A container according to claim 1 wherein said expansion chamber means includes a plurality of box-like structures each of a different size and arranged in spaced apart nesting relationship to provide said chamber portions therebetween.

3. A container according to claim 2 wherein said box-like structures are formed of a plurality of wall members and each of said structures has an open top abutting said one wall of the container.

4. A container according to claim 3 wherein structures have side and bottom wall members, said metal grids being alternately located in side and bottom wall members in succeeding structures to provide the baffle effect upon the gas.

5. A container according to claim 4 wherein said expansion chamber means includes at least three box-like structures.

6. A container according to claim 5 wherein the grid of the outermost box-like structure is fine enough to act as a flame trap.

References Cited

UNITED STATES PATENTS

| | | | |
|---|---|---|---|
| 1,312,695 | 8/1919 | Kessler | 220—86 |
| 1,553,395 | 9/1925 | Kessler et al. | 220—86 |
| 1,914,277 | 6/1933 | Moreland | 220—86 |
| 2,602,465 | 7/1952 | Goehring | 220—86X |
| 2,644,612 | 7/1953 | Roberts | 220—86 |

RAPHAEL H. SCHWARTZ, Primary Examiner

U.S. Cl. X.R.

220—88